United States Patent [19]
Leichty et al.

[11] Patent Number: 5,645,392
[45] Date of Patent: Jul. 8, 1997

[54] DUNNAGE HANDLING SYSTEM

[75] Inventors: Deryll L. Leichty, Berne; Dave P. Reinhart, Portland, both of Ind.; Thomas W. Youngblutt, Brighton, Mich.

[73] Assignee: Micromatic Operations, Inc., Holland, Mich.

[21] Appl. No.: 525,946

[22] Filed: Sep. 8, 1995

[51] Int. Cl.⁶ ................................ B65G 65/02
[52] U.S. Cl. ............... 414/416; 414/788.7; 414/797.5; 414/798.1
[58] Field of Search .................... 414/416, 933, 414/927–930, 788.7, 797.5, 798, 798.1

[56] References Cited

U.S. PATENT DOCUMENTS

| | | | |
|---|---|---|---|
| 3,113,683 | 12/1963 | Von Gall, Jr. | 414/929 X |
| 3,137,286 | 6/1964 | Raynor | 414/930 X |
| 3,780,884 | 12/1973 | Jones | 414/933 X |
| 3,788,497 | 1/1974 | Carlson | 414/933 X |
| 4,180,361 | 12/1979 | Longinotti | 414/788.7 |
| 4,274,779 | 6/1981 | Longinotti | 414/788.7 |
| 4,358,236 | 11/1982 | Dudley | 414/929 X |
| 4,588,341 | 5/1986 | Motoda | 414/788.4 |
| 4,720,228 | 1/1988 | Horiguchi et al. | 414/928 |
| 4,946,340 | 8/1990 | Murphy et al. | 414/788.8 |
| 5,033,935 | 7/1991 | DeCrane | 414/798.1 |
| 5,123,796 | 6/1992 | Chiappe et al. | 414/927 X |

FOREIGN PATENT DOCUMENTS

| | | | |
|---|---|---|---|
| 513939 | 6/1956 | Italy | 414/798 |
| 209435 | 10/1985 | Japan | 414/797.5 |

*Primary Examiner*—David A. Bucci
*Attorney, Agent, or Firm*—Perman & Green

[57] ABSTRACT

The apparatus of this invention comprises a tray destacking station, a part unloading station, and a tray stacking station arranged sequentially adjacent and connected by a pallet transport system and a tray transport system. This system is designed to move a pallet containing a stack of fully loaded trays into the destacking station, raise the dunnage and suspend the stack over the pallet. The pallet is then removed from the bottom of the stack. In a similar manner the stack is then raised and suspended over the bottom tray to allow it to be moved into the unloading station. After the parts are removed from the tray, the tray is moved into the stacking station where it is positioned underneath the stack of empty trays. This is accomplished by providing a lift at the destacking and stacking stations which raises and lowers the stack in operative association with racks that engage, suspend, and release the stack to allow the trays to be separated from the bottom of the stack.

11 Claims, 14 Drawing Sheets

DUNNAGE HANDLING SYSTEM

BACKGROUND OF THE INVENTION

In the course of manufacturing parts, it is sometimes necessary to package the partially assembled work piece for shipment to another location for further assembly or other manufacturing operations. The manufacturer is then faced with the need to unpackage the parts, unload the parts, perform the needed operation, and then repackage the shipping containers (dunnage) for return. A typical method of packaging is to place the parts in trays arranged in rows and columns and stack the trays in layers. The trays may be molded plastic shaped to accommodate the particular part or work piece. The stack of trays is then loaded on a shipping pallet and secured for shipment. At the destination, the stack must be removed from the pallet and each tray separated from the stack. The parts are then unloaded from the individual trays and moved into the manufacturing line. The empty trays must be stacked and placed back on the pallet for future use.

An example of the type of parts packaged in this manner is automotive parts such as pistons. A particular manufacturing operation is the assembly of the pistons with the piston rings. In this example the pistons are loaded in trays which may have ten rows of recesses of nine in a row. As many as 14 full trays may be stacked on a pallet. Each stack can weigh in excess of a ton. The handling of such dunnage requires machinery of considerable size. It is, therefore, desirable to reduce the size of the handling apparatus to reduce the shop floor area required.

Prior art systems such as shown in U.S. Pat. No. 4,946,340, use the most obvious approach, namely to destack the trays starting at the top and working downward. This requires a high frame extending well above the height of the stack because the apparatus which unloads the parts from the tray must operate above the entire stack. The path of this system leaves the empty pallet to be handled last. Since the transport of the pallet to the stacking zone must be accomplished before any of the empty trays can be restacked, a costly delay is caused in the manufacturing process.

The system of the '340 patent is approximately ten feet in height and is controlled from a platform at least five feet off the shop floor. It is the purpose of this invention to provide a dunnage handling system of reduced height and area while eliminating costly delays in handling the stacks. The part unloading system of this invention operates at a height of only one tray above the associated conveyors.

SUMMARY OF THE INVENTION

The apparatus of this invention comprises a tray destacking station, a part unloading station, and a tray stacking station arranged sequentially adjacent and connected by a pallet transport system and a tray transport system. This system is designed to move a pallet containing a stack of fully loaded trays into the destacking station, raise the dunnage and suspend the stack over the pallet. The pallet is then removed from the bottom of the stack. In a similar manner the stack is then raised and suspended over the bottom tray to allow it to be moved into the unloading station. After the parts are removed from the tray, the tray is moved into the stacking station where it is positioned underneath the stack of empty trays. This is accomplished by providing a lift at the destacking and stacking stations which raises and lowers the stack in operative association with racks that engage, suspend and release the stack to allow the trays to be separated from the bottom of the stack. These motions are sequentially controlled to provide the desired handling operations. The pallet may, in this manner, be immediately transported from underneath the stack to the unloading station where it is stored until needed. While the stack is in the raised position, racks are moved into engagement with the trays to provide support for the stack when the lift is lowered. The lower-most tray is allowed to rest on rollers free of the weight of the upper stack of trays. A shuttle engages the tray to pull it from under the stack and move it to the unloading station. After the pistons are unloaded, the shuttle is moved into engagement of the next full tray. The shuttle is also used to push the empty tray to the stacking station. The stacking station is a mirror image of the destacking station. A lift raises the trays so that the stack can be engaged by the racks and suspended. After the lift is lowered, the next empty tray can be loaded on the rollers and assembled as the bottom tray of the stack.

By operating from the bottom of the stack, there is no need for frames to extend beyond the height of the stack and the unloading apparatus operates on one tray at the lowest possible position. In this system the controls are on the shop floor in a conveniently accessible position. Most importantly the destacking and stacking functions are accomplished without delaying the unloading process. This provides more parts faster to the manufacturing operation and avoids costly delays which cause a cascade of downtime along the manufacturing line.

DESCRIPTION OF THE DRAWING

The invention is described in more detail below with reference to the attached drawing and in said drawing.

DESCRIPTION OF THE PREFERRED EMBODIMENT

Figure 1:
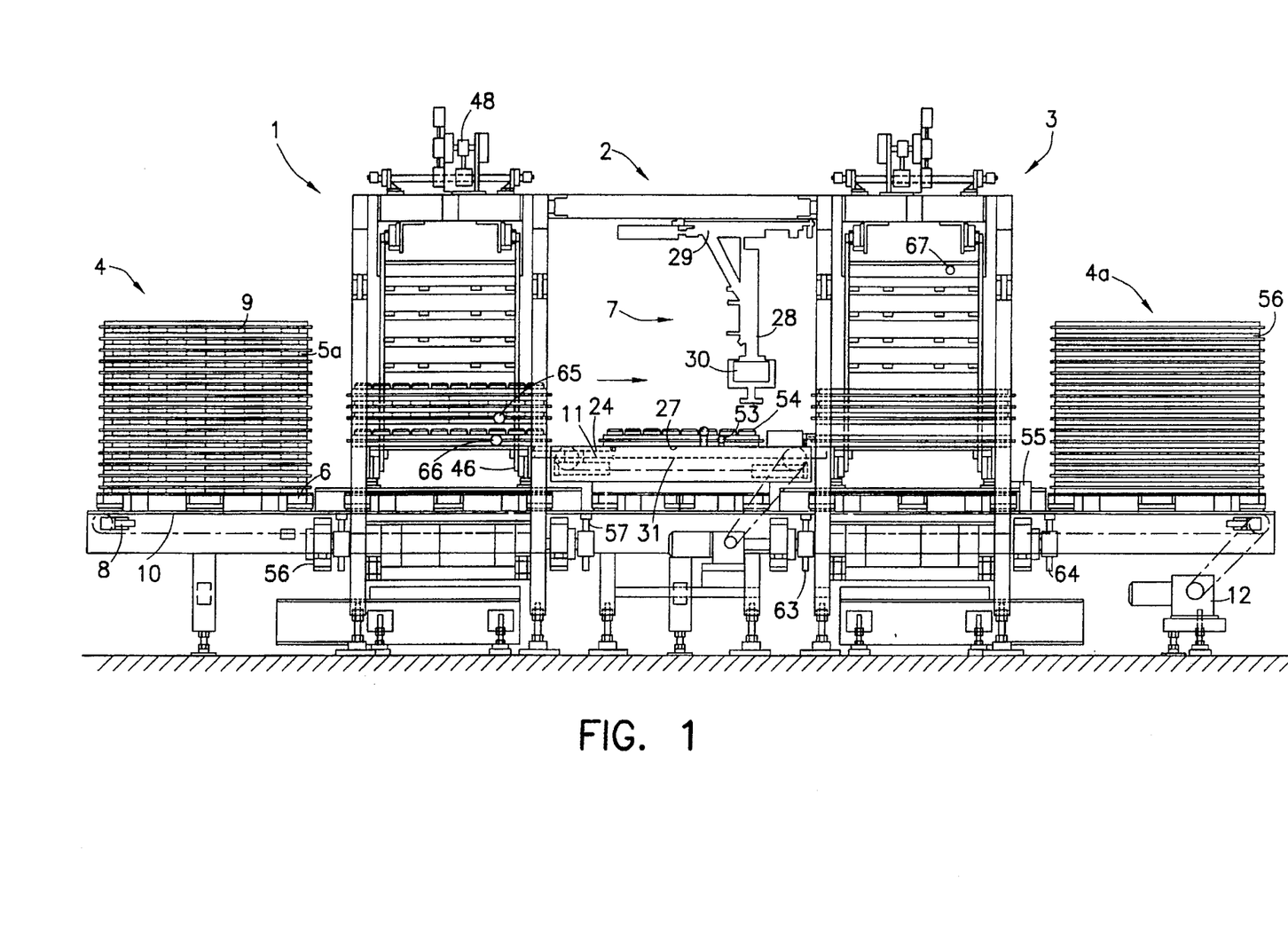
FIG. 1 is a side view of the system of this invention showing the destacking station, the unloading station, and the stacking station.

The handling system of this invention consists of a destacking station 1, an unloading station 2, and a stacking station 3. The stations are located in a sequential line, as shown in FIG. 1, connected by a main conveyor 10 which moves from the destacker 1, to the unloading station 2, to the stacker 3. The system is constructed to handle parts which are arranged in rows on trays 5. The trays are stacked vertically in layers and placed on a supporting pallet 6 for shipping.

For illustration, we will refer to the parts as being pistons 9 which must be unloaded and placed on a conveyor (not shown) in a single line for transport to a manufacturing operation such as piston ring assembly. The stack of trays 4, mounted on pallet 6, is introduced to the handling system and is moved into position in the destacking station 1 where it must be separated from pallet 6.

The Destacking Station

Figure 2:
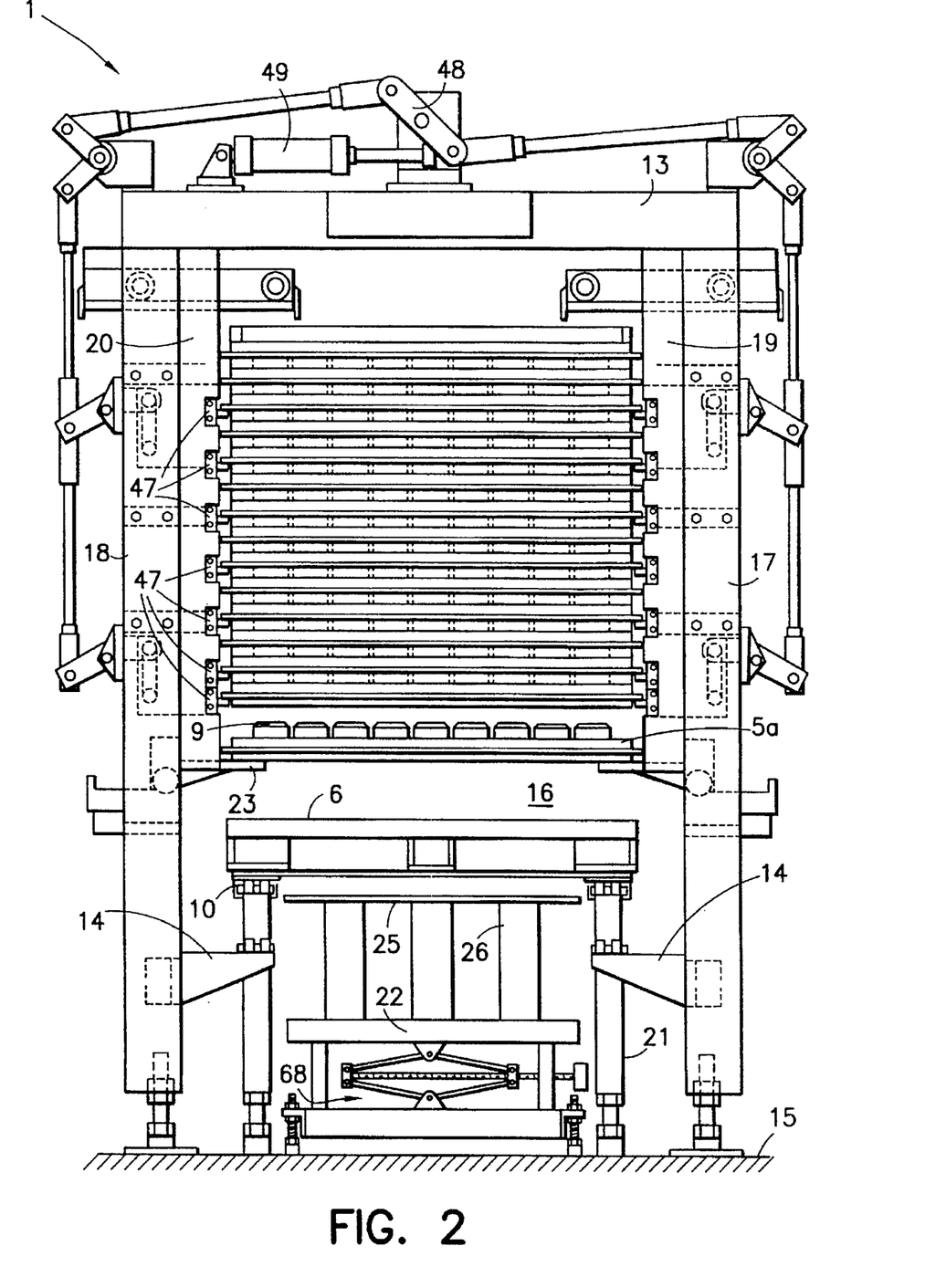
FIG. 2 is an end view at the entrance to the destacking station.

Destacking station 1 is shown in FIG. 2 and consists of a frame 13 secured to the shop floor 15. The frame 13 is constructed with a central passage 16 through which the main conveyor 10 extends. The frame 13 consists of vertical side members 17 and 18 on either side of passage 16, which are fixed to and aligned with conveyor 10 through brackets 14. A pair of opposing racks 19 and 20 are mounted for horizontal movement into the passage 16 from each of the side members 17 and 18. As shown in FIG. 2, main conveyor 10 is mounted on supports 21 within the passage 16. The conveyor 10, as shown in FIG. 1, is driven by a motor 12 and is arranged to transport the empty pallet 6 from the destacking station. A lift 22 is mounted under the conveyor supporting frame 21 within the destacking station 1. Lift 22 is constructed with a platform 25 mounted on posts 26 to engage the pallet 6 and stack 4. The lift 22 is raised and lowered by an appropriate mechanism such as a hydraulic or screw driven scissors jack 68. Upon actuation, the lift 22 will raise the assembly off of the conveyor 10 sufficiently to allow the opposing racks 19 and 20 to engage the trays 5 and hold the trays 5 above the pallet 6. At this point, the lift, carrying only the pallet 6, can be lowered until the pallet 6 rests on conveyor 10. The conveyor drive 12 can then be energized to transport the pallet 6 into the unloading station at stop 63.

Opposing racks 19 and 20 are constructed having multiple rails 47 extending into passage 16 to engage every other tray 5 of stack 4 when the racks 19 and 20 are moved into their extended position. The rack assemblies are sufficiently strong to hold the two filled trays. The number of racks used depends on the weight of each tray. The racks 19 and 20 are operatively connected to the crank mechanism 48 to extend and retract the rack assemblies. As best shown in FIG. 2, the mechanism 48 may be actuated by pneumetic cylinder 49.

Transport rollers 23 are mounted at the lower portion of racks 19 and 20 to receive the lowest tray 5 of the stack 4 when the rack is engaged. The transport rollers 23 may be independently retractable to allow free movement of the pallet 6 up and down on the lift 22. Rollers 23 form part of a tray transport mechanism 24 which operates to move the loaded trays 5 to the unloading station 2, and subsequently moves the emptied trays 5 into the stacking station 3.

The Unloading Station

After the bottom tray is received by the transport rollers 23, it is pulled into the unloading station 2 by engagement with shuttle 31 of transport mechanism 24. The transport system 24 at the unloading station 3 consists of an indexing conveyor 27 which advances the full tray 5a in steps to the unloading boom 28 mounted on overhead gantry 29. A suction head 30 is mounted on the boom 28 to engage a row of pistons, lift the row out of the tray 5, and deposit the pistons onto a production line conveyor (not shown). Such mechanisms are well known as shown in U.S. Pat. No. 3,780,884.

Figure 4:
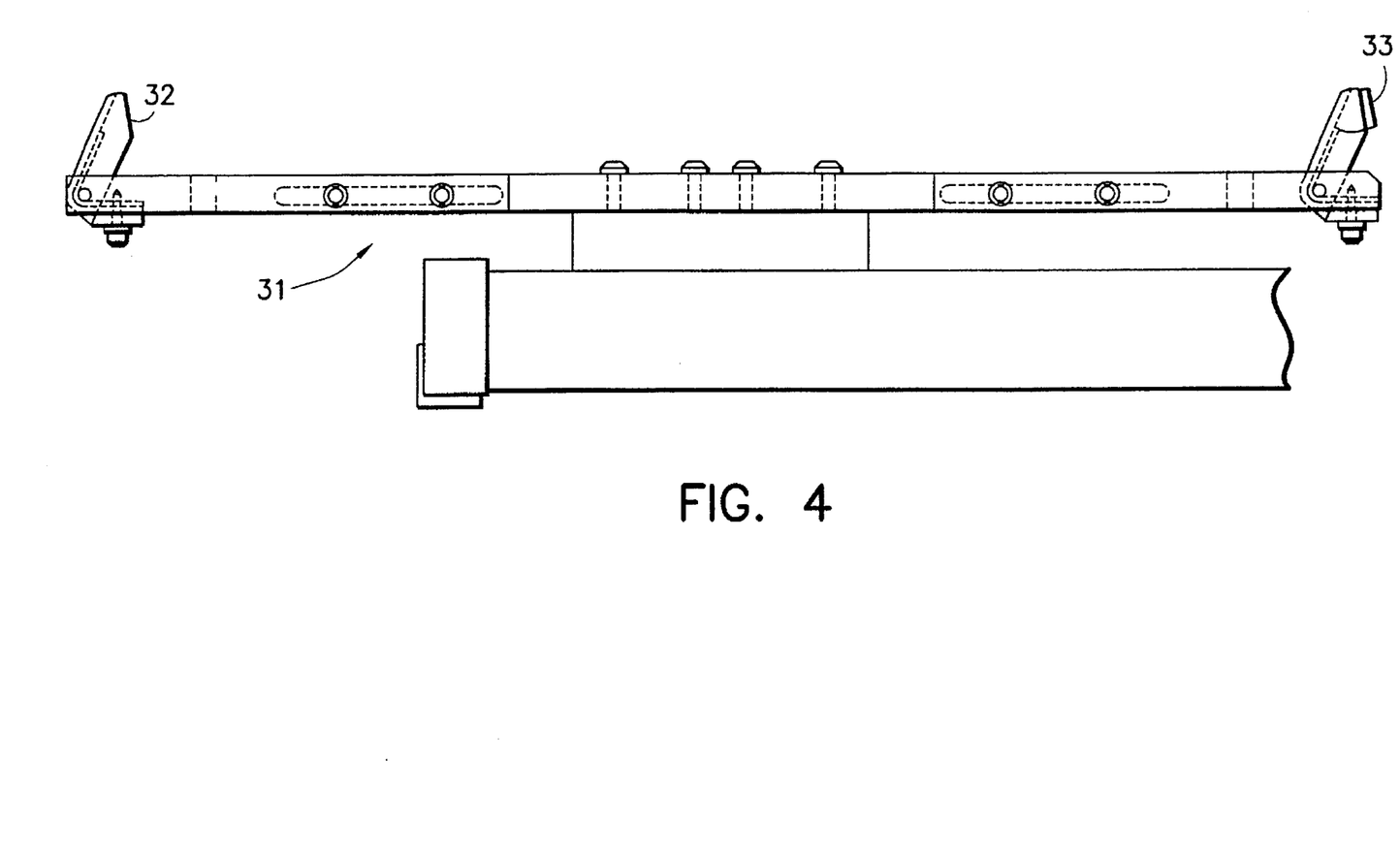
FIG. 4 is a side view of the tray shuttle.

Mounted on tracks 11 below the conveyor 27 is a tray shuttle 31 which is moved back and forth between the unloading station 2 and the destacking station 1. As shown in FIG. 4, the shuttle 31 is equipped with spring loaded, retractable pull dog 32 and push dog 33. When the bottom tray 5a is disengaged from the pallet 6 and its upper counterparts, the shuttle 31 translates into the destacking station 1 and the pull dog 32 engages the destacked tray 5a. As the shuttle 31 withdraws back to unloading station 2, it pulls the loaded tray 5a onto indexing conveyor 27, which sequentially steps each row of pistons under the suction head 30 where it is unloaded. Any preceding empty tray 5b on conveyor 27 would be engaged by the push dog 33 of the shuttle 31 and pushed into the stacking station 3.

The system of this invention allows the trays to be unloaded at a convenient height above the shop floor because no clearance need be allowed for the full stack of trays, only the single tray being unloaded.

The Stacking Station

Figure 3:
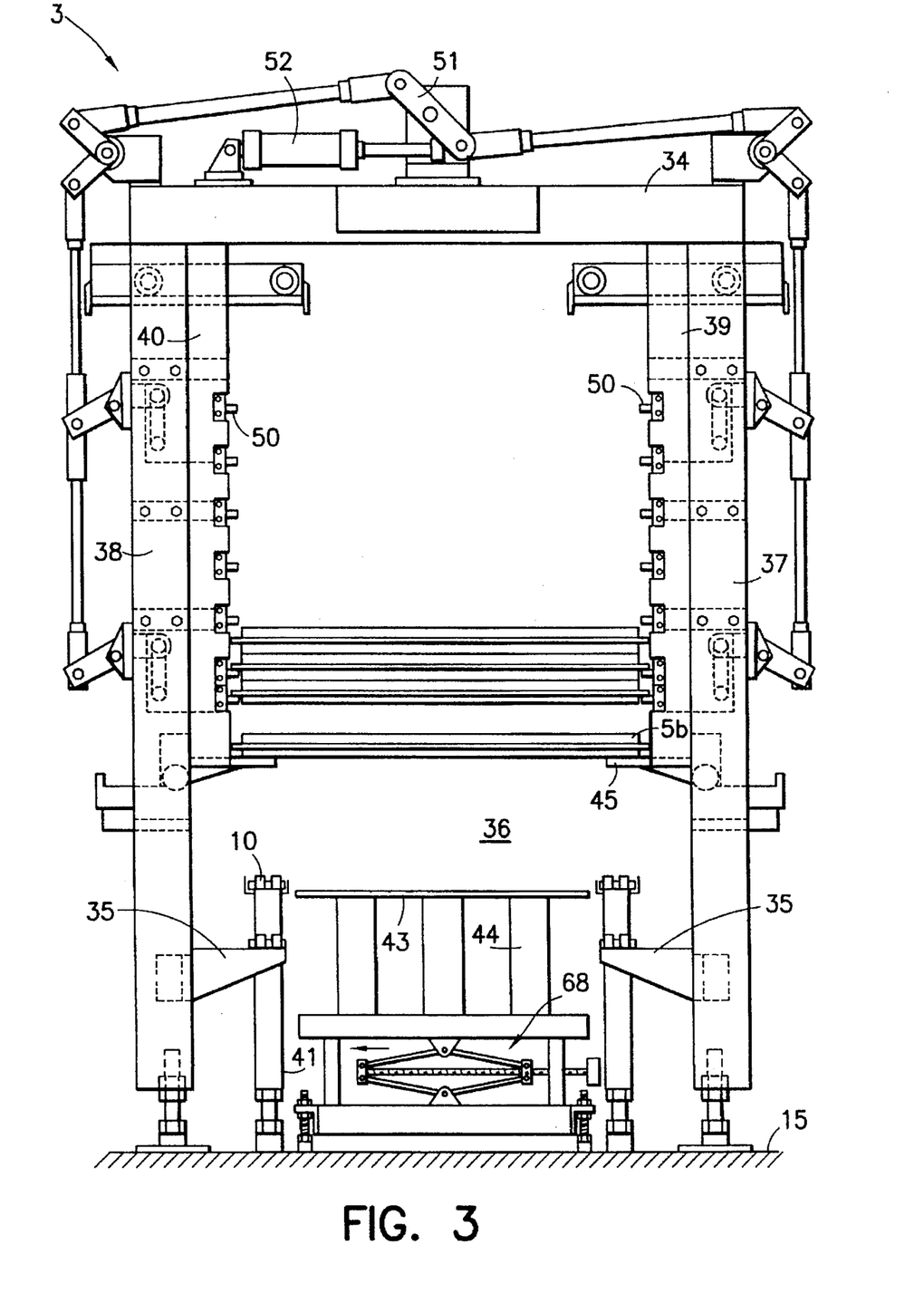
FIG. 3 is an end view at the entrance to the stacking station.

Stacking station 3 is identical to destacking station 1, but operates substantially in reverse to stack the empty trays and load them on the pallet for future use. As shown in FIG. 3, station 3 consists of a frame 34 secured to the shop floor 15. The frame 34 is constructed with a central passage 36 through which the main conveyor 10 extends. The frame 34 consists of vertical side members 37 and 38 on either side of passage 36 which are fixed to and aligned with conveyor 10 through brackets 35. A pair of opposing racks 39 and 40 are mounted for horizontal movement into the passage 36 from each of the side members 37 and 38. As shown in FIG. 2, main conveyor 10 is mounted on supports 41 within the passage 36. The conveyor 10 is arranged to transport the empty pallet 6 from the unloading station into the stacking station 3 to receive the stacked trays 5b. A lift 42 is mounted under the conveyor supporting frame 41 within the stacking station 3. Lift 42 is constructed with a platform 43 mounted on posts 44 to engage the pallet 6 and stack 4a of empty trays 5b. Upon actuation, the lift 42 will raise the trays 5b sufficiently to allow the opposing racks 19 and 20 to engage and suspend the trays 5b above the lift 42.

Opposing racks 39 and 40 are constructed having multiple rails 50 extending into passage 36 to engage every other trays 5b of stack 4a when the racks 39 and 40 are moved into their extended position. The rack assemblies are sufficiently strong to hold the two empty trays. The number of rails used depends on the weight of each tray. The racks 39 and 40 are operatively connected to the crank mechanism 51 to engage and retract the rack assemblies. As best shown in FIG. 3, the mechanism 51 may be actuated by a pneumatic cylinder 52.

Transport rollers 45 are mounted at the lower extreme of racks 39 and 40 to receive the empty tray 5b from the unloading conveyor 27. The transport rollers 45 may be independently retractable to allow free movement of the pallet 6 on the lift 42. Rollers 45 are a continuation of the tray transport mechanism 24. The push dog 33 of tray shuttle 31, as shown FIG. 4, engages the unloaded tray 5b and pushes it off of conveyor 27 onto the transport rollers 45. At this point previously unloaded trays 5b are suspended on the racks 39 and 40 above the last tray from the unloading station. Lift 42 is energized to lift the tray on rollers 45 into engagement with the stack above to allow the withdrawal of the racks 39 and 40. The stack is then lifted further to allow the racks 39 and 40 to engage and suspend the stack 4a. When the stack is complete, the main conveyor 10 is activated to move the pallet 6 into position under the stack. Once in position the lift actuates to raise the pallet into engagement with the stack to unseat and allow the racks 39 and 40 to disengage and the pallet and stack assembly to be removed from the stacking station 3. The pallet and stack of empty trays may then be returned for further use.

Operation

It is essential to the operation of the system that the activities of the main conveyor, the lifts 22 and 42, the racks 19, 20, 39 and 40, the tray conveyor 27, the tray shuttle 31, and the unloading mechanisms 28–30 be monitored at all times in the process of handling the dunnage within the system of this invention. The monitoring system consists of a series of photo electric or proximity switches which are strategically located to keep track of the position of the pallet, stack, trays, and pistons. The control system will be described in the context of the operation of the system.

Returning to the destacking station 1, a fork lift present switch 8 senses the presence of a fork lift as it loads a fully loaded pallet onto the conveyor 10 to deactivate the conveyor 10 while the pallet is placed in position. When the fork lift is removed, the switch activates conveyor 10 to move the pallet 6 and stack 4 into the destacking station 1. A pallet present switch 46 is positioned at the forward portion of the destacker station 1 and is actuated by the pallet 6 when it is in position against stop 57 for destacking. Tray present switches 65 and 66 operate a stop 56 at the entrance of passage 16 which will prevent another pallet from entering the destacking station 1 before the station is empty.

Figure 5:
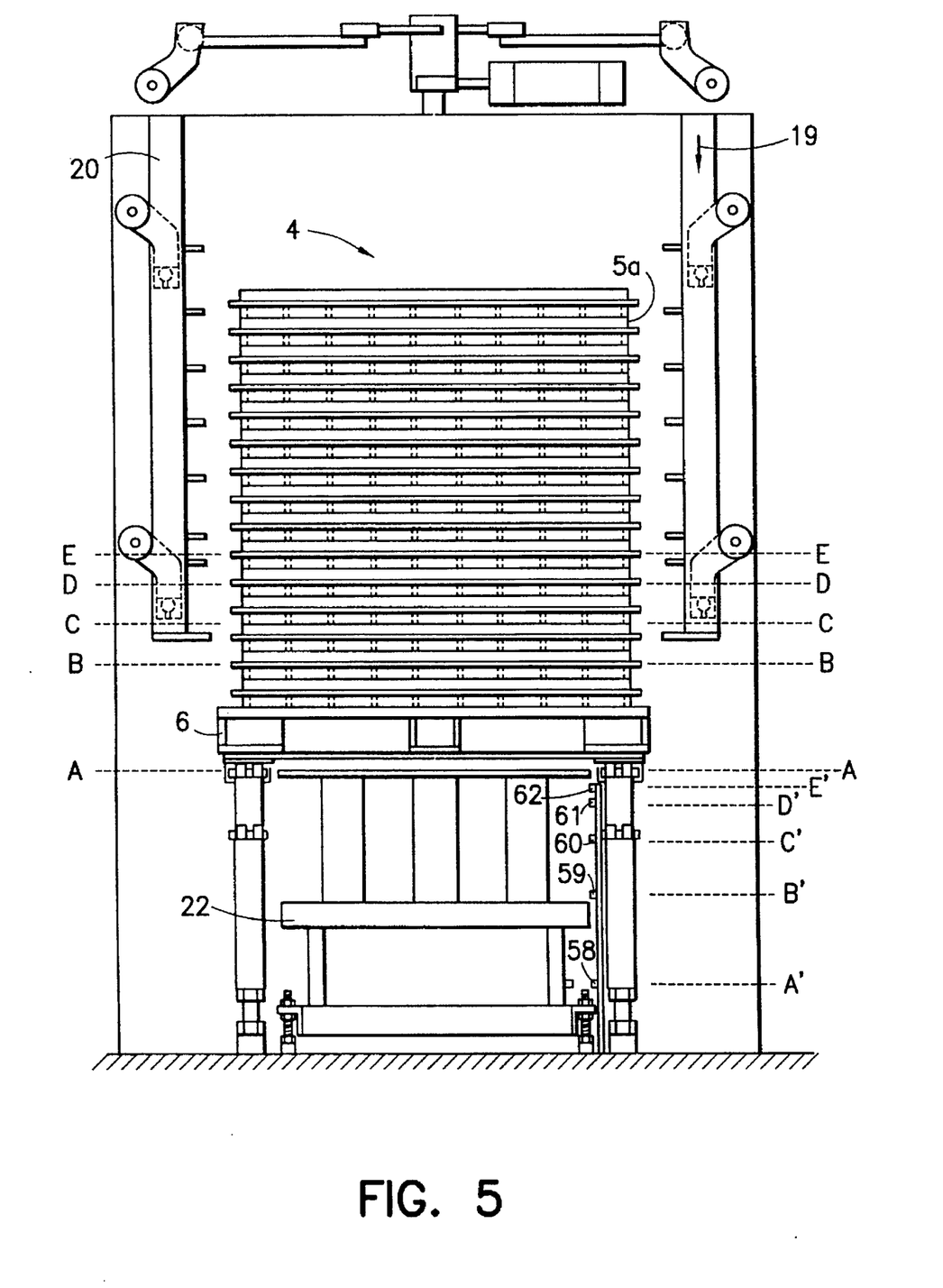
FIGS. 5 through 5f shows the sequence of operation of the lift and rack of this invention in the destacking station.
Figure 5A:
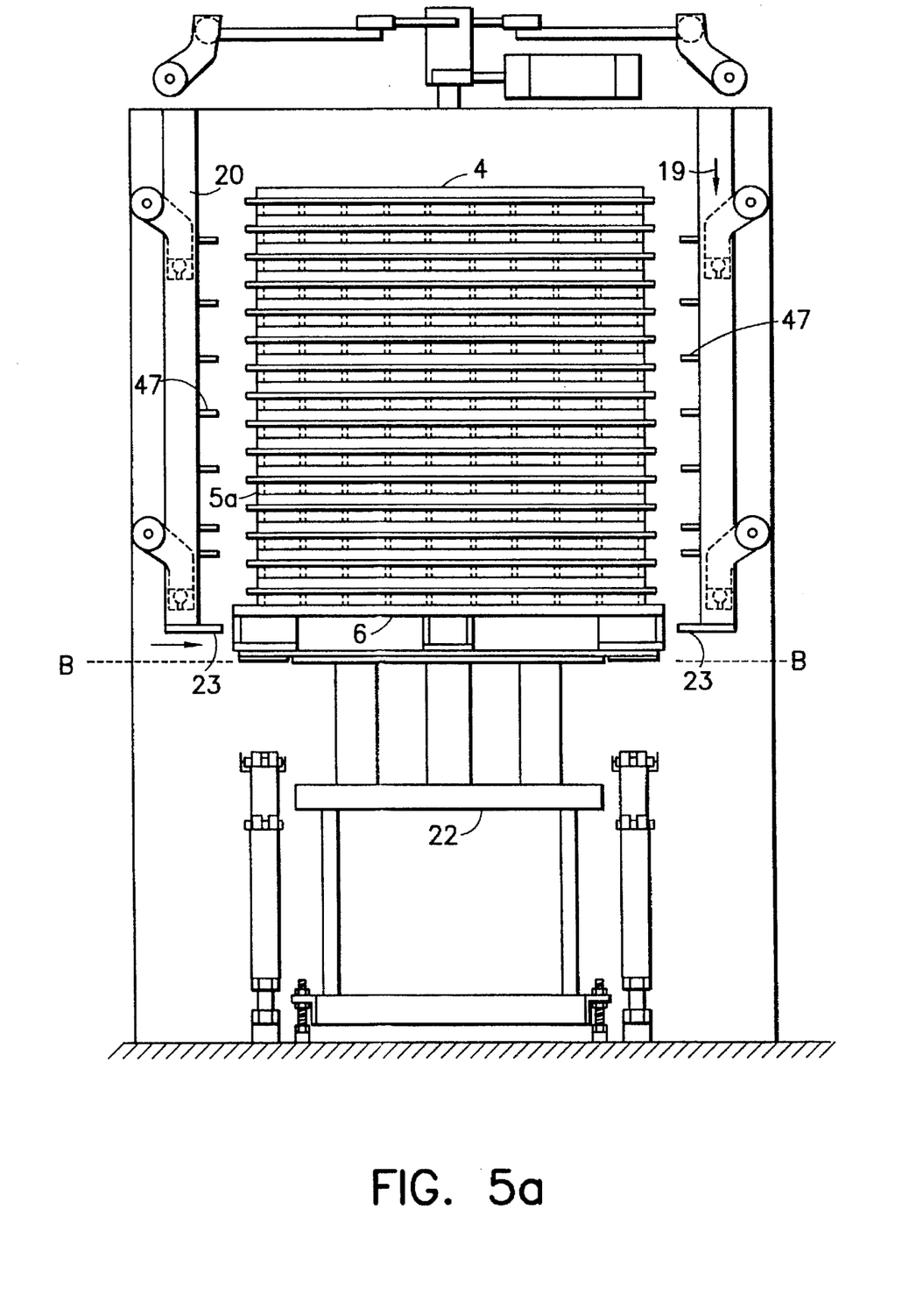
Figure 5B:
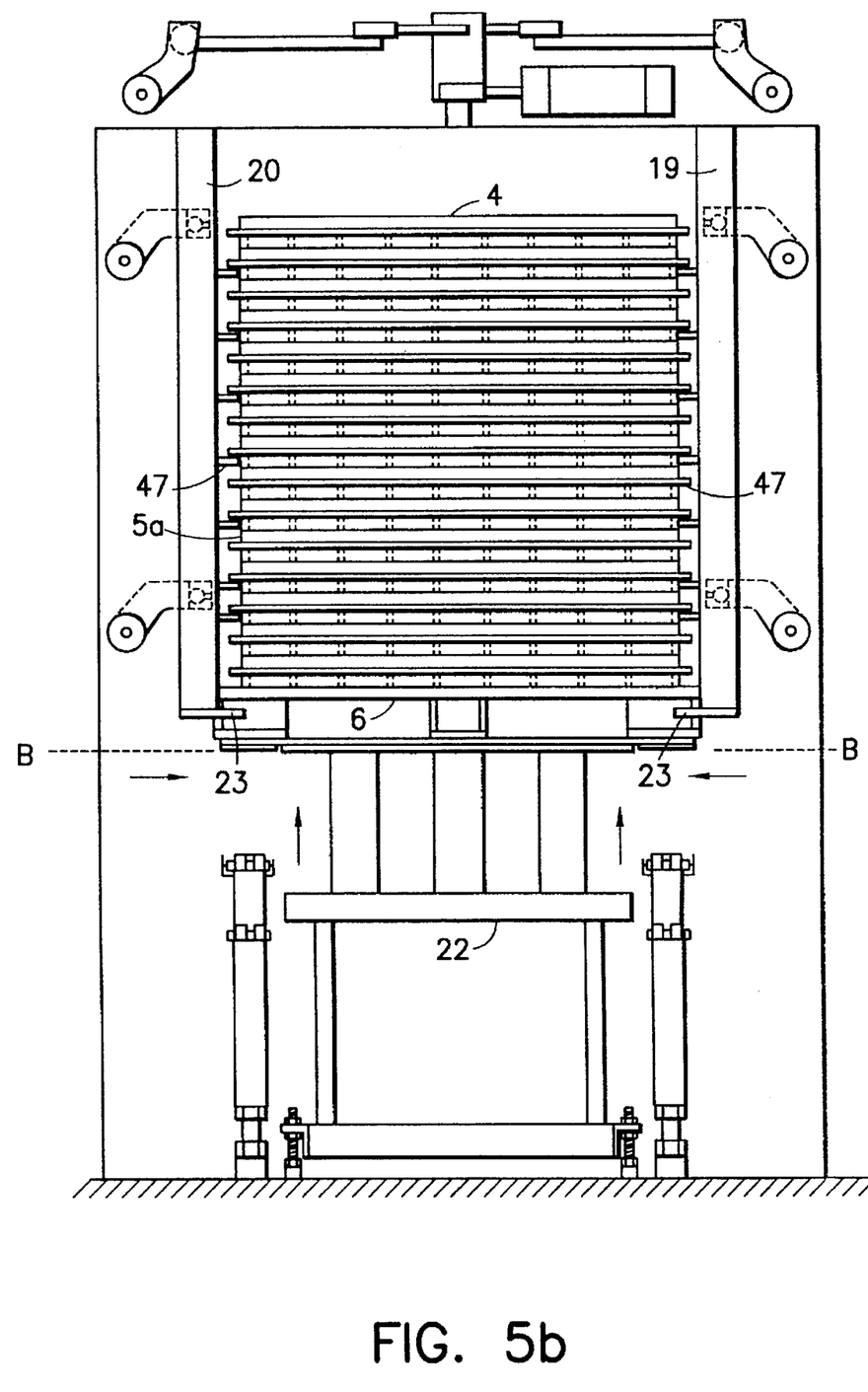
Figure 5C:
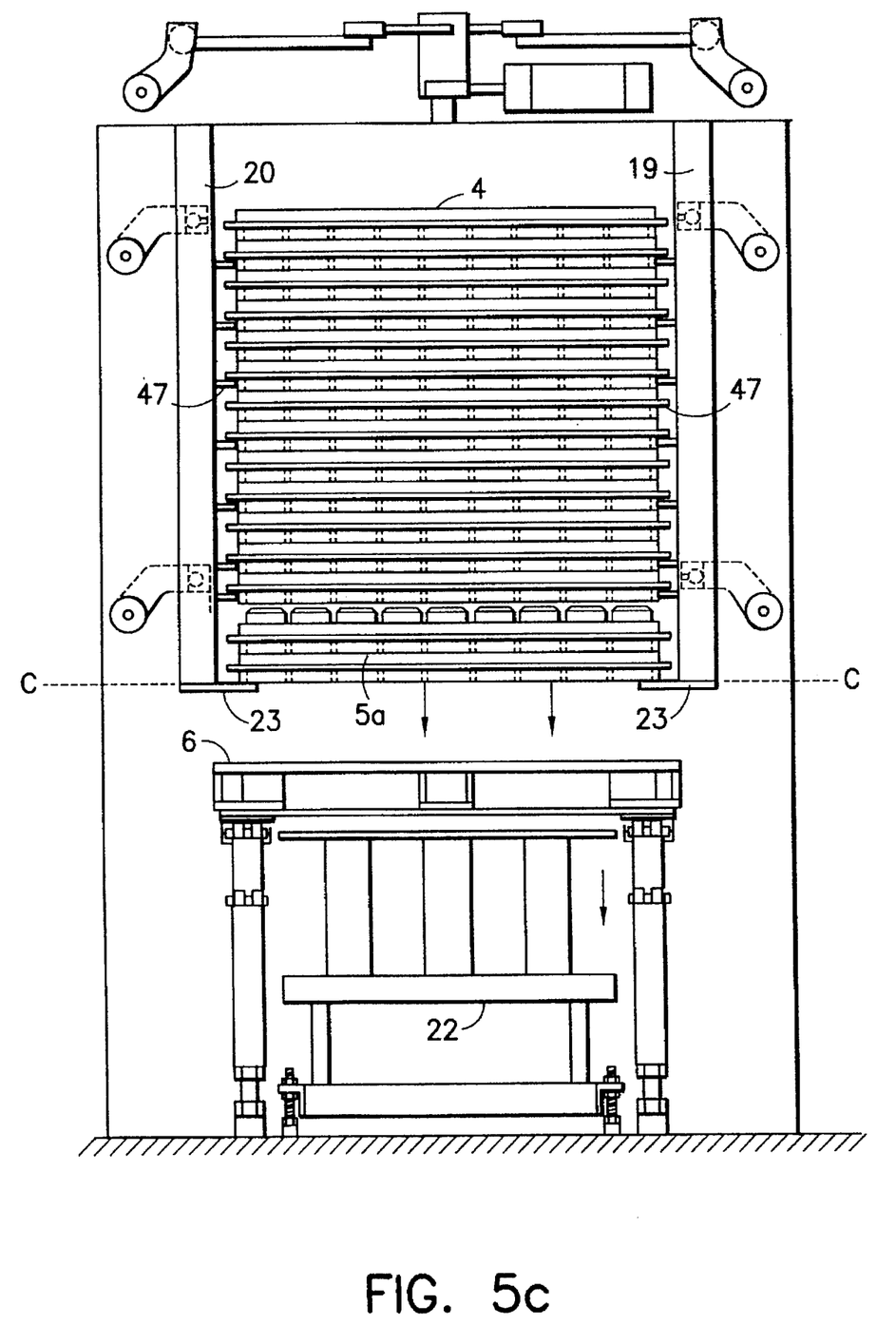
Figure 5D:
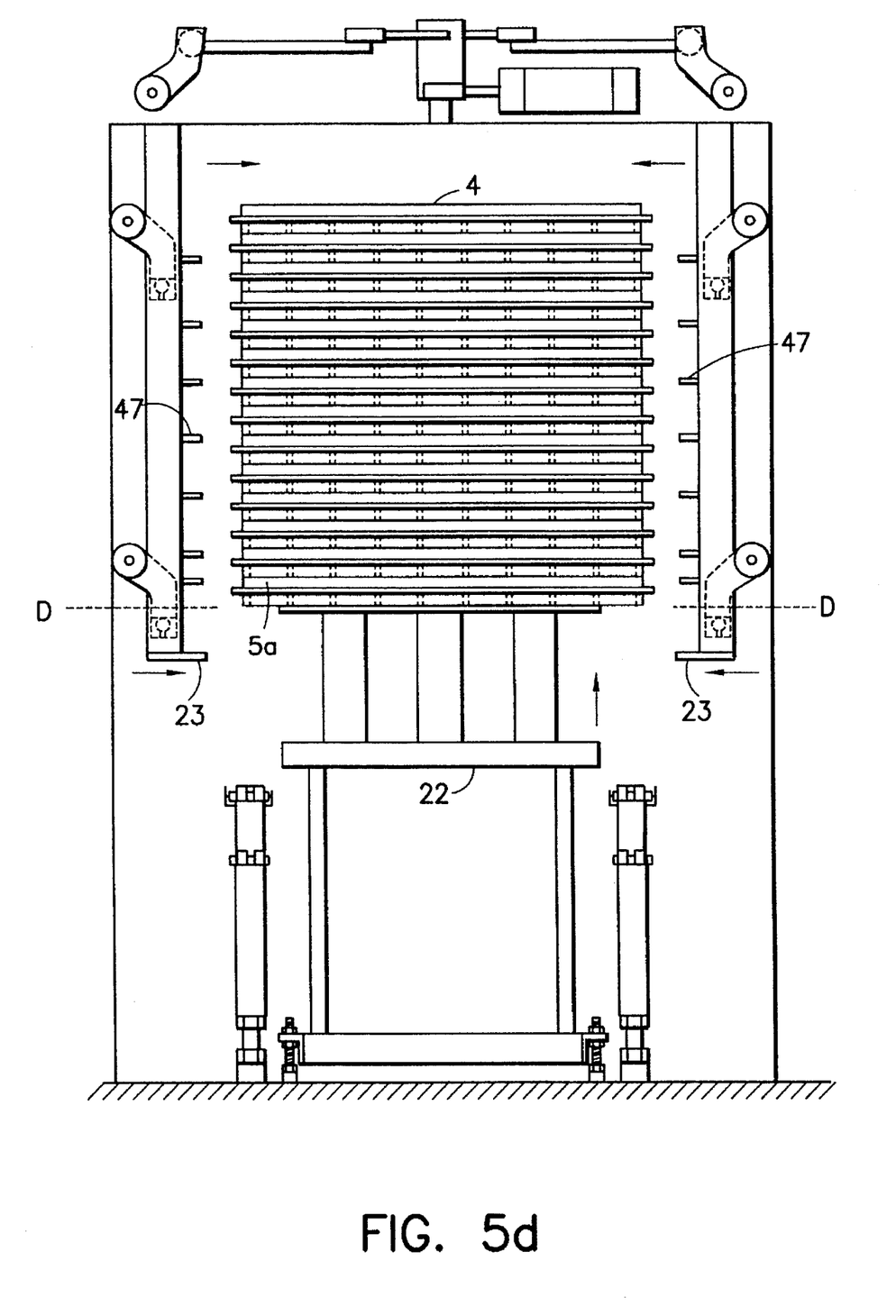
Figure 5E:
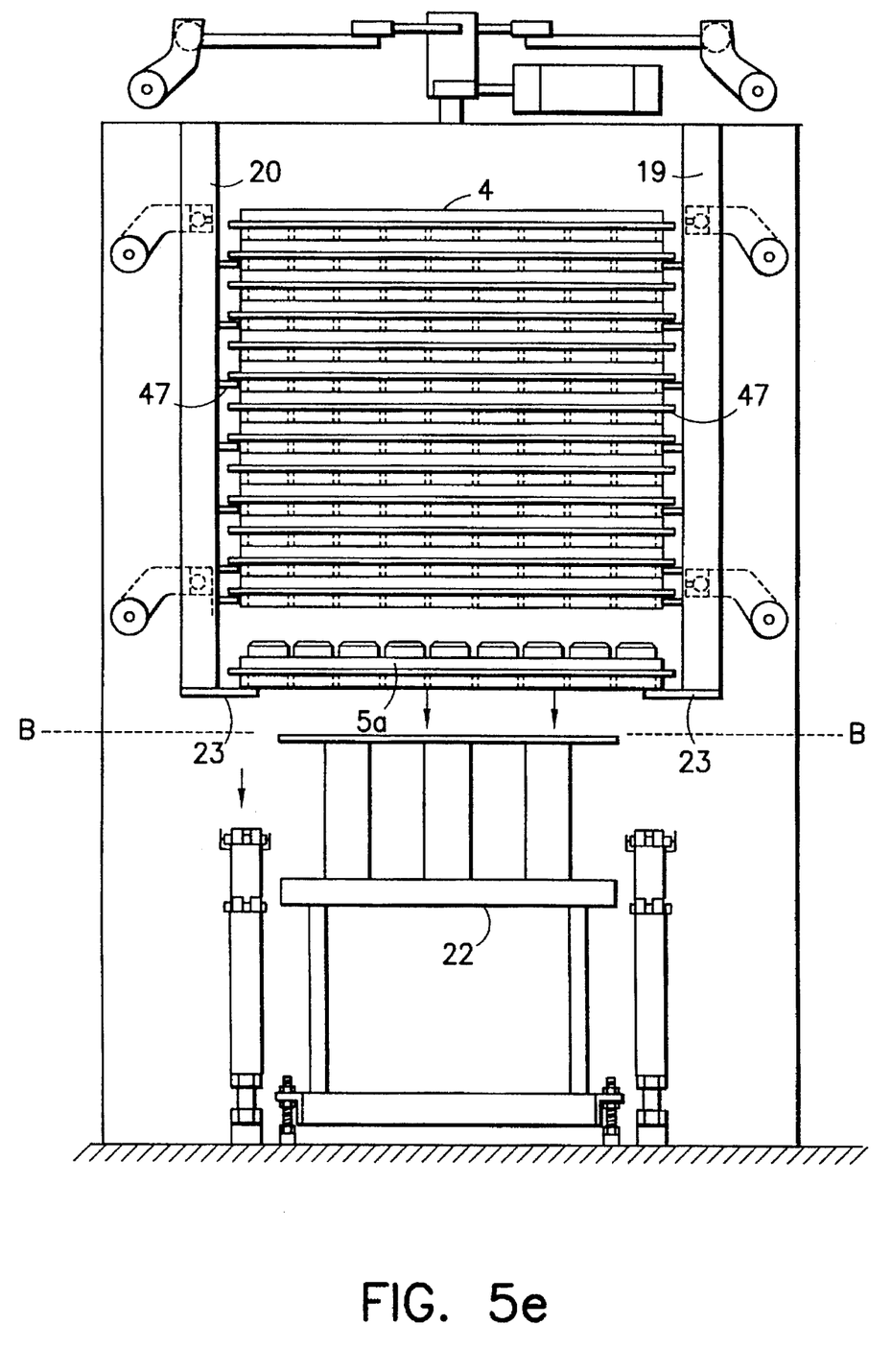
Figure 5F:
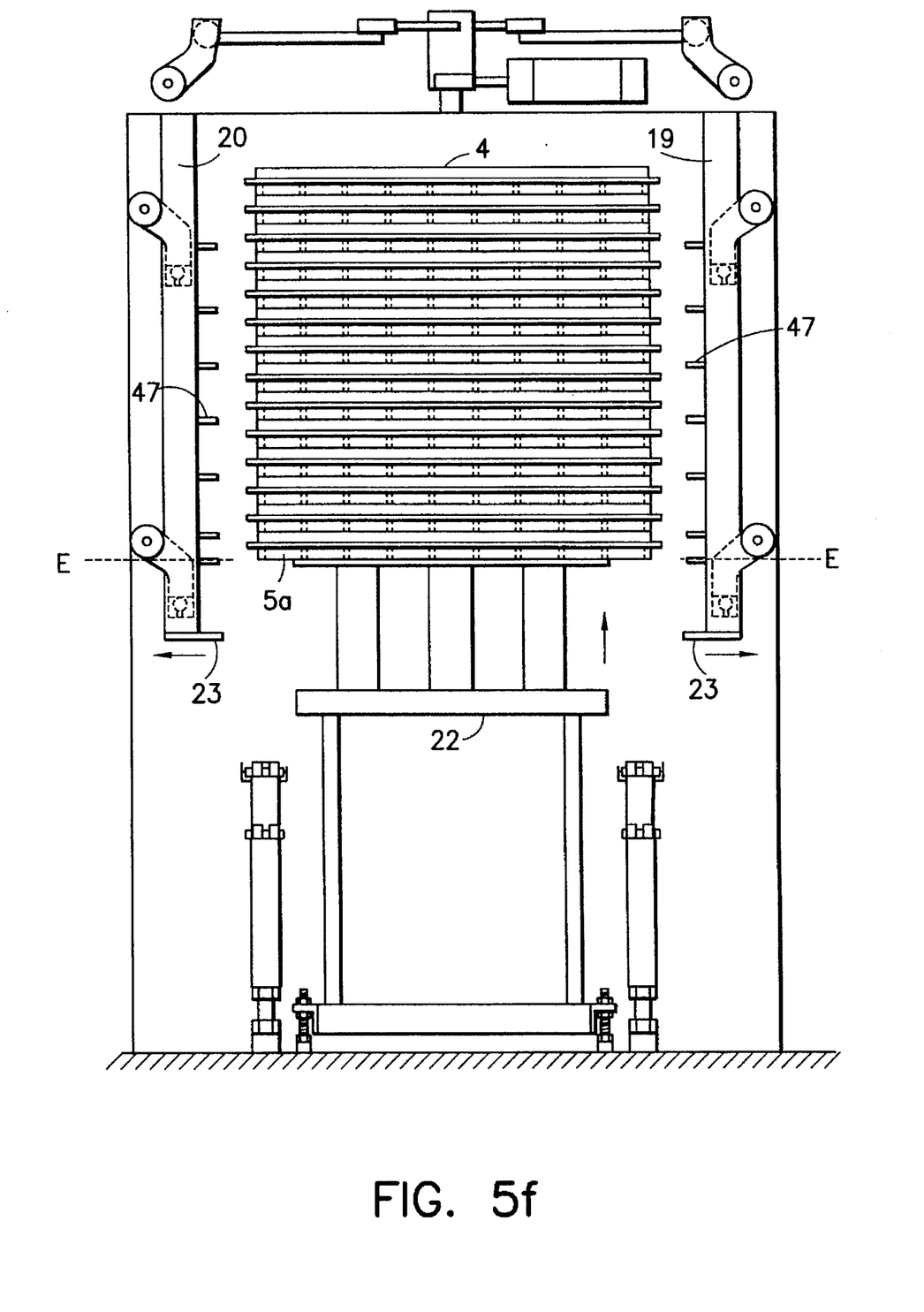

The starting position of the destacking operation is illustrated in FIG. 5 which shows the lift 22 in its lowest position under the pallet 6. The pallet 6 is resting on the conveyor 10 and the racks 19 and 20 are withdrawn. Switch 46 also signals the initiation of the destacking operation beginning with the raising of lift 22. Lift 22 has 5 positions at predetermined heights as shown in FIGS. 5 through 5f. Each position is governed by proximity switches 58–62 located at the predetermined levels, A'–E' as shown in FIG. 5. The levels correspond to the levels A–E described below.

The lift is first raised to position B at which the rollers 23 are aligned with cut outs in the pallet 6. Racks 19 and 20 are extended to engage the stack 4 and release the pallet 6. The lift is then returned to position A where pallet 6 is resting on the conveyor 10. Conveyor 10 is activated to transport the empty pallet 6 to a storage position under the unloading station 2. With the pallet out of the way, the destacking process can now proceed.

Lift 22 is raised to position C, which is just high enough for the lift 22 to engage the stack 4 and unseat the trays from the rails 47 of racks 19 and 20. Withdrawal of the racks 19 and 20, then allows the lift 22 to be raised to level D at which the rails 47 are aligned with the trays 5 and are extended into engagement with the stack 4 above the bottom tray 5a of the stack 4. This leaves the bottom tray on the lift 22 with the tray transport rollers 23 under the bottom tray. Lowering of the lift 22 to level B will bring the bottom tray 5a to rest on the tray transport rollers 23. The tray shuttle 31 is actuated to pull tray 5a into the unloading station 2. With the removal of the destacked tray, the tray present switch 66 on destacker rollers 23 is open, signalling the destacker to destack another tray. The lift 22 is then enabled and raises to its highest level E at which the rails 47 are unseated and withdrawn. Lift 22 then returns to level D and the rails 47 are again extended to engage the stack above the next bottom tray. Destacking continues when the tray 5a is unloaded at the unloading station 2.

In order to support the remaining stack in the destacking station during the unloading process, the lift 22 remains engaged with the stack. Therefore, before lift 22 is allowed to descend from level D to level B to place the bottom tray on the rollers 23 of the destacking station 1, the tray in the unload station 2 must be empty and the tray shuttle 31 must be moved into place. When the last row of pistons is unloaded from the tray 5a, movement of the shuttle 31 into the destacking station is initiated. Upon the triggering of a proximity switch (not shown) by the shuttle 31 in its extended position, lift 22 completes the step of lowering the bottom tray 5a onto the tray transport rollers 23, thereby closing the tray present switch 66 and engaging the pull dog 32 of shuttle 31. Shuttle 31 then retracts, pulling the full tray 5a onto the indexing conveyor 27. The lowering of the lift 22 to position B triggers the retraction of the shuttle 31 and initiates the movement of tray conveyor 27. Full retraction of the shuttle 31 also pushes the empty tray 5b off of the tray conveyor 27. Conveyor 27 steps the tray row-by-row into the zone of operation of suction head 30 as switch 54 indicates that a row of pistons has been unloaded.

Tray present switch 53 indicates when a tray is in position in the unloading station and piston present switch 54 indicates that the next row of pistons is positioned for unloading. Together these switches control the operation of the unloading station 2. When the switches 53, 54 indicate that the tray 5a is in position with pistons 9 in place, the unloading boom 28 moves the suction head 30 on the overhead gantry 29 into engagement with a row of pistons. A source of vacuum (not shown) is energized and the pistons 9 are picked up by the suction head 30 and moved to the production line conveyor (not shown). The vacuum is turned off and the pistons 9 are allowed to drop onto the conveyor where they are transported to the next manufacturing operation. Switches 53 and 54 will indicate when the last row of pistons 9 are unloaded and will trigger the extension of the tray shuttle 31 to pick up the next full tray 5a and push the empty tray 5b into the stacking station.

Figure 6:
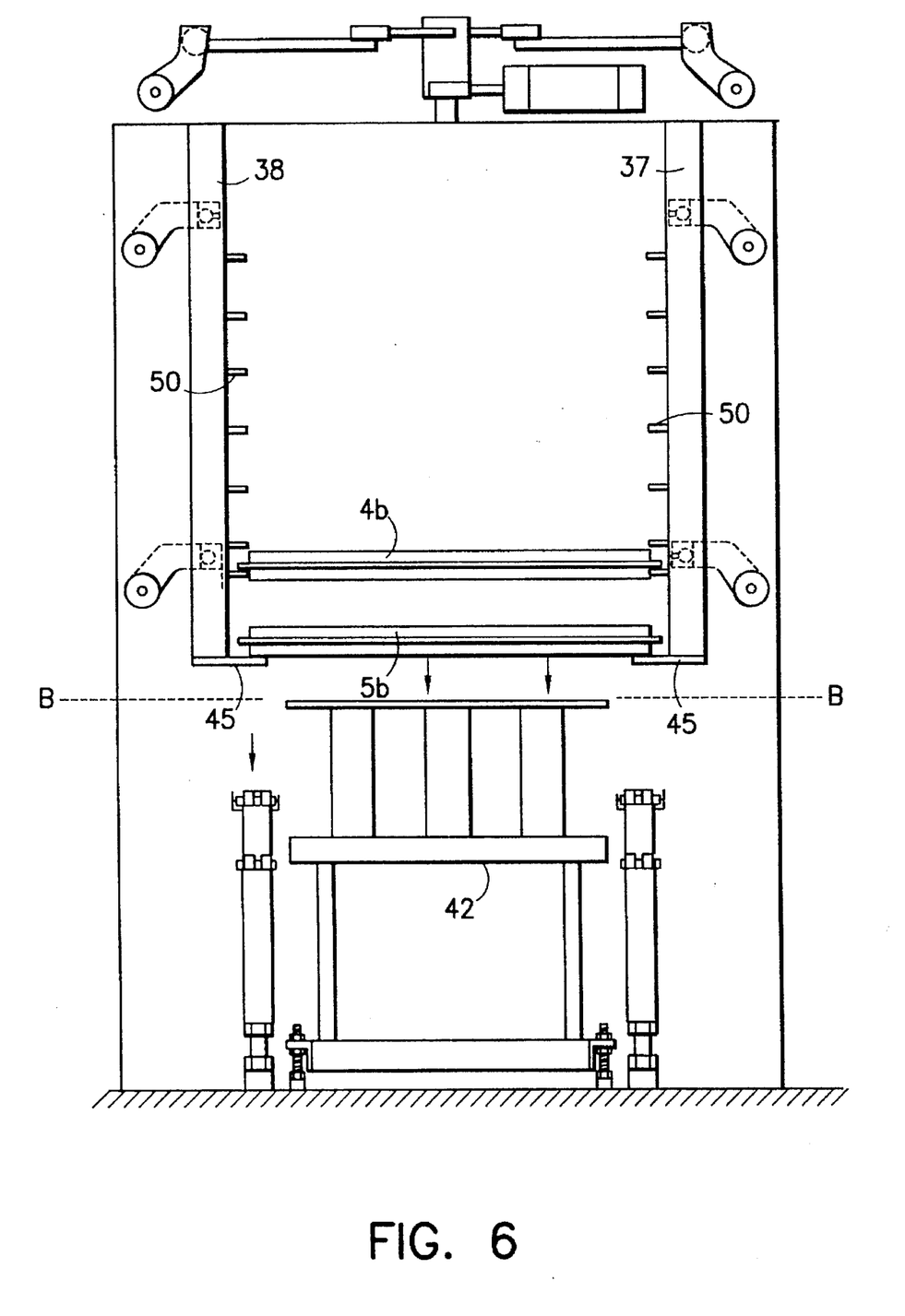
FIGS. 6 through 6b shows the sequence of operation of the lift and rack of this invention in the stacking station.
Figure 6A:
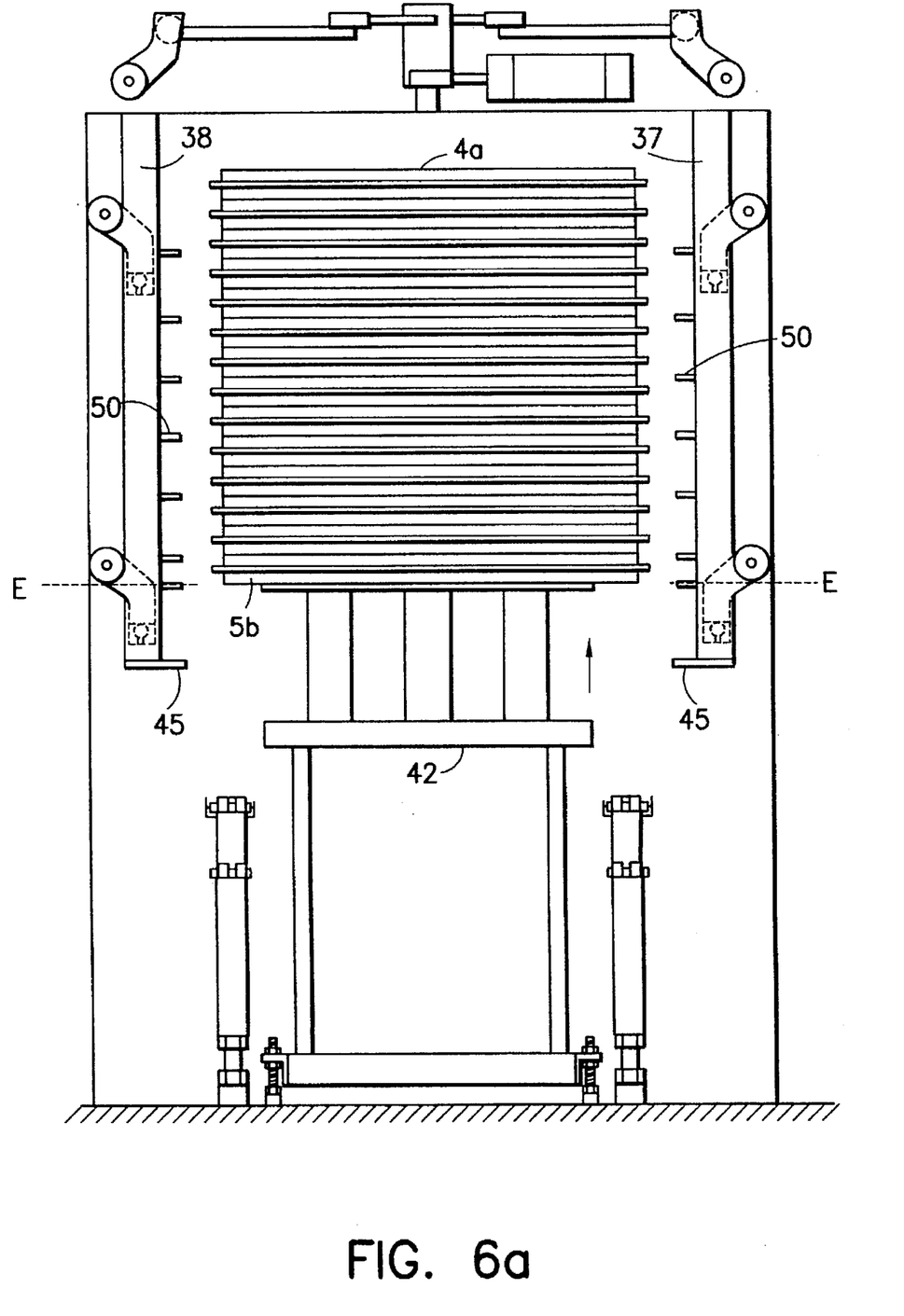
Figure 6B:
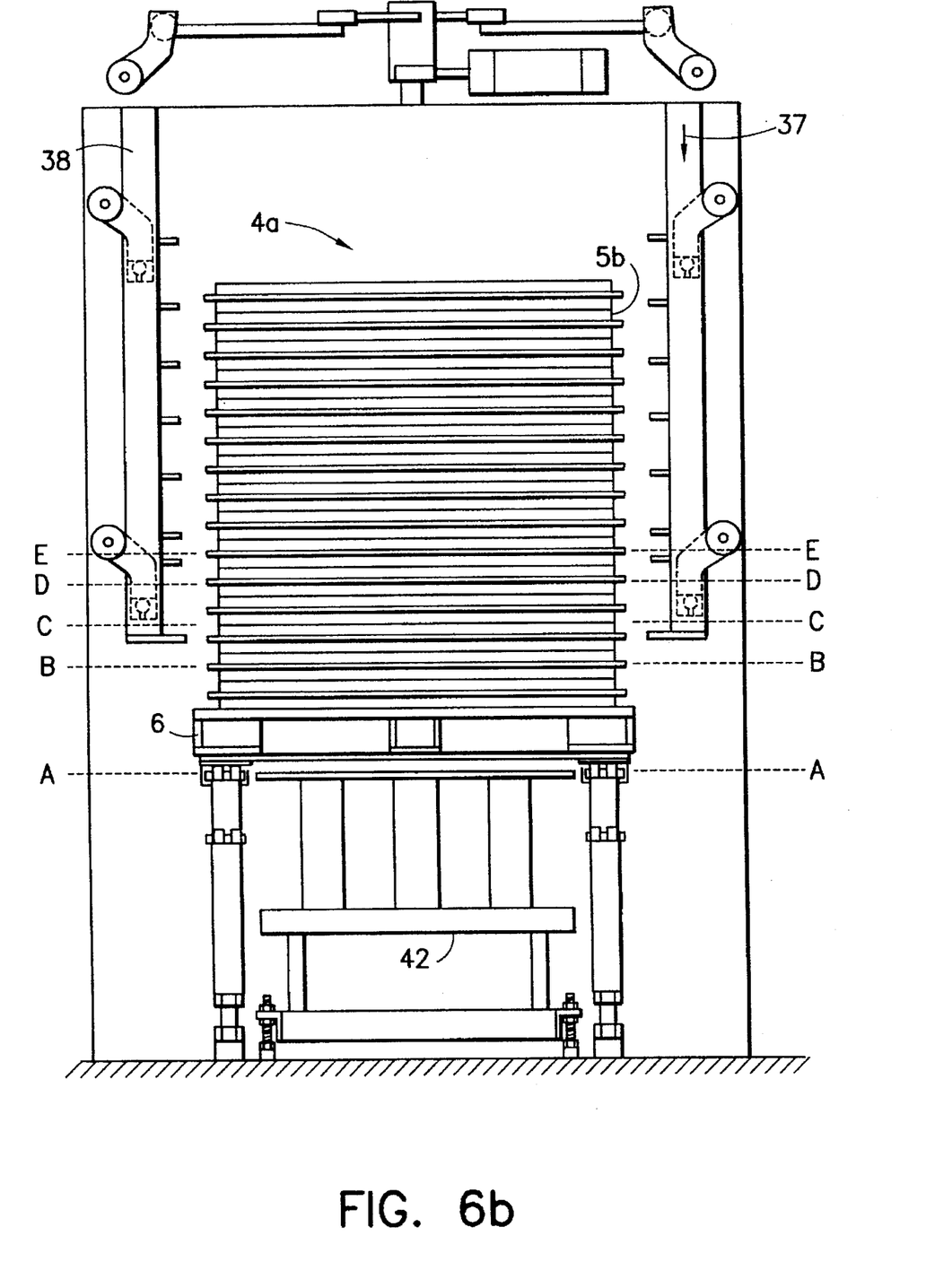

The normal position of the stacking station 3 is shown in FIG. 6 in which the stack of unloaded trays 4b is suspended on rails 50 in the stacking station 3. The next empty tray 5b is pushed directly onto the tray support rollers 45. Lift 42 raises the arrived tray 5b into engagement with the stack 4b and then raises the stack 4b to level D to unseat the stack 4b from rails 50. Racks 37, 38 retract to free the stack 4b. Lift 22 is then raised to level E where the racks 37, 38 are extended to re-engage and suspend the stack 4b until the next empty tray 5b is in position. When the stacking station full switch 67 indicates that the last tray has been consolidated into the stack in the stacking station, pallet 6 can be brought into position by energizing conveyor 10 after lift 42 is lowered to its bottom position A. Pallet present switch 55 triggers the lift to raise, engaging pallet 6 and raising it into engagement with the stack 4b. The racks 37, 38 are retracted, withdrawing rails 50 and leaving the stack 4b resting on the pallet 6. Lift 42 then retracts to level A where the pallet 6 and stack 4b rests on conveyor 10 for transport out of the stacking station for removal.

In this manner complicated handling of heavy dunnage is accomplished in a simple and efficient manner, while minimizing the height of the machinery above the shop floor and the area of shop floor required for operation.

What is claimed is:

1. Apparatus for handling multiple work pieces arranged in trays, said trays stacked vertically in horizontal layers from a bottom tray to a top tray and said stack of trays supported from beneath by a pallet, said apparatus comprising:

a tray destacking station, a work piece unloading station, and a tray stacking station, said stations connected by a pallet transport system and a tray transport system to move the pallets and the trays sequentially from station to station;

first lift means at the destacking station to move vertically up and down to raise and lower the stack of trays;

first rack means at the destacking station to move horizontally to engage, suspend and release the stack of trays;

system control means operatively associated with the first lift means to cause the lift means to raise and lower the stack of trays, and to cause the rack means to engage, suspend, and release the stack according to a predetermined sequence in which the stack of trays are lifted and suspended above the pallet to allow the pallet to be moved from under the stack by the pallet transport system and the stack is sequentially lifted and suspended above the bottom tray of the stack to allow the bottom tray to be moved from under the stack by the tray transport system while the upper trays are suspended;

first means in the transport system to direct the bottom tray into the workpiece unloading station after said bottom tray is removed from the bottom of the stack;

pick-up means at the workpiece unloading station to unload the workpieces from the tray;

second means in said transport system to direct the unloaded tray from the unloading station into the stacking station;

second lift means at the stacking station to move vertically up and down to raise and lower the stack of trays;

second rack means at the stacking station to move horizontally to engage, suspend, and release the stack of trays;

said system control means further operatively associated with the second lift means to cause said second lift means to raise and lower the stack of trays, and with the second rack means to cause the second rack means to engage, suspend, and release said stack according to a predetermined sequence in which the stack of trays are lifted and suspended to allow the unloaded tray to be moved under the stack by the tray transport system and to raise said unloaded tray to said stack to add said unloaded tray to the bottom of the stack; and when the stack of unloaded trays are assembled, the stack of unloaded trays are sequentially lifted and suspended to allow the pallet to be moved under the stack on the pallet transport means to allow the pallet to be raised to the stack of unloaded trays and the pallet and trays to be lowered onto the pallet transport system.

2. Apparatus for handling multiple work pieces arranged in trays, said trays stacked vertically in horizontal layers from a bottom tray to a top tray and said stack of trays supported from beneath by a pallet, as described in claim 1 wherein:

the destacking station and the stacking station each comprises a structural frame having at least a pair of vertically extending sides and a horizontally extending top interconnecting the sides to form a passage within the frame; and, the pallet transport system and the tray transport system is positioned within the passage along a path interconnecting said stations.

3. Apparatus for handling multiple work pieces arranged in trays, said trays stacked vertically in horizontal layers from a bottom tray to a top tray and said stack of trays supported from beneath by a pallet, as described in claim 1 wherein the first and second lift means each comprises:

drive means to raise and lower the lift into and out of supporting engagement with the stack of trays;

a platform mounted on the drive means to provide a supporting surface for the lift;

a plurality of switches forming part of the system control means is operatively associated with the lift to detect the position of the platform;

wherein the lift switches activate the rack means to engage, suspend, and release the stack of trays in the predetermined sequence.

4. Apparatus for handling multiple work pieces arranged in trays, said trays stacked vertically in horizontal layers from a bottom tray to a top tray and said stack of trays supported from beneath by a pallet, as described in claim 1 wherein the first and second rack means comprises:

a pair of racks mounted on each side of the structural frame for opposing horizontal motion to extend and retract the racks into the passage;

at least one pair of supporting rails mounted on opposite racks for movement therewith and extending into the passage to engage and suspend the stack of trays in the extended position of the racks and to release the trays in the retracted position of the racks;

a pair of transport rails mounted on the racks below the supporting rails for movement therewith and extending into the passage to engage the bottom tray of the stack in the extended position of the racks and to release the trays in the retracted position of the racks, said transport rails forming part of the tray transport system; and drive means operatively connected to the racks to extend and retract said racks.

5. Apparatus for handling multiple work pieces arranged in trays, said trays stacked vertically in horizontal layers from a bottom tray to a top tray and said stack of trays supported from beneath by a pallet, as described in claim 4 wherein the transport rails further comprise a series of rollers to allow movement of the trays thereon.

6. Apparatus for handling multiple work pieces arranged in trays, said trays stacked vertically in horizontal layers from a bottom tray to a top tray and said stack of trays supported from beneath by a pallet, as described in claim 4 wherein a plurality of pairs of supporting rails is mounted on opposite racks for movement therewith, said rails extend into the passage to engage and suspend at least one tray of the stack in the extended position of the racks and to release said at least one tray in the retracted position of the racks.

7. Apparatus for handling multiple work pieces arranged in trays, said trays stacked vertically in horizontal layers from a bottom tray to a top tray and said stack of trays supported from beneath by a pallet, as described in claim 4 wherein the transport rails are mounted on the racks for independent movement thereon to retract and extend the transport rails separately from the racks.

8. Apparatus for handling multiple work pieces arranged in trays, said trays stacked vertically in horizontal layers from a bottom tray to a top tray and said stack of trays supported from beneath by a pallet, as described in claim 2 wherein the unloading station is positioned in the tray transport system between the destacking station and the stacking station and comprises:

means positioned and constructed to unload the workpieces from the trays;

unloading station transport means to move the trays into the unloading station into an operative position with the unloading means, said unloading station transport means forming part of the tray transport system;

unloading control means within the system control means to activate the unloading means.

9. Apparatus for handling multiple work pieces arranged in trays, said trays stacked vertically in horizontal layers from a bottom tray to a top tray and said stack of trays supported from beneath by a pallet, as described in claim 2 wherein the pallet transport means comprises a conveyor mounted within the passage forming a path for the pallet below the tray transport means.

10. Apparatus for handling multiple work pieces arranged in trays, said trays stacked vertically in horizontal layers from a bottom tray to a top tray and said stack of trays supported from beneath by a pallet, said apparatus comprising:

a tray destacking station, a work piece unloading station, and a tray stacking station, said stations connected by a pallet transport system and a tray transport system to move the pallets and the trays sequentially from station to station, said destacking station and the stacking station each comprising a structural frame having at least a pair of vertically extending sides and a horizontally extending top interconnecting the sides to form a passage within the frame, and the pallet transport system and the tray transport system is positioned within the passage along a path interconnecting said stations, said unloading station being positioned in the tray transport system between the destacking station and the stacking station and further comprises means positioned and constructed to unload the workpieces from the trays;

unloading station transport means to move the trays into the unloading station into an operative position with the unloading means, said unloading station transport means forming part of the tray transport system;

first lift means at the destacking station to move vertically up and down to raise and lower the stack of trays;

first rack means at the destacking station to move horizontally to engage, Suspend and release the stack of trays; system control means operatively associated with the first lift means to cause the lift means to raise and lower the stack of trays, and to cause the rack means to engage suspend and release the stack according to a predetermined sequence in which the stack of trays are lifted and suspended above the pallet to allow the pallet to be moved from under the stack by the pallet transport system and the stack is sequentially lifted and suspended above the bottom tray of the stack to allow the bottom tray to be moved from under the stack by the tray transport system while the upper trays are suspended;

means in the tray transport system to direct the bottom tray into the workpiece unloading station after said bottom tray is removed from the bottom of the stack;

means at the workpiece unloading station to unload the workpieces from the tray;

means in the tray transport system to direct the unloaded tray from the unloading station into the stacking station;

second lift means at the stacking station to move vertically up and down to raise and lower the stack of trays;

second rack means at the stacking station to move horizontally to engage, suspend, and release the stack of trays;

said system control means further operatively associated with the second lift means to cause the said second lift means to raise and lower the stack of trays, and with the second rack means to cause the second rack means to engage, suspend, and release said stack according to a predetermined sequence in which the stack of trays are lifted and suspended to allow the unloaded tray to be moved under the stack by the tray transport system and to raise said unloaded tray to said stack to add said unloaded tray as the bottom tray of the stack; and when the stack of unloaded trays are assembled, the stack of unloaded trays are sequentially lifted and suspended to allow the pallet to be moved Under the stack on the pallet transport system to allow the pallet to be raised to the stack of unloaded trays and the pallet and trays to be lowered onto the pallet transport system.

11. Apparatus for handling multiple work pieces arranged in trays, said trays stacked vertically in horizontal layers from a bottom tray to a top tray and said stack of trays supported from beneath by a pallet as described in claim 10 wherein the tray transport system extends above the pallet transport system to form a substantially horizontal path at a level to receive the bottom tray of the stack in the destacking station.

* * * * *